Oct. 22, 1963  D. C. PALM  3,107,952
BUSHING ASSEMBLY
Original Filed April 24, 1957
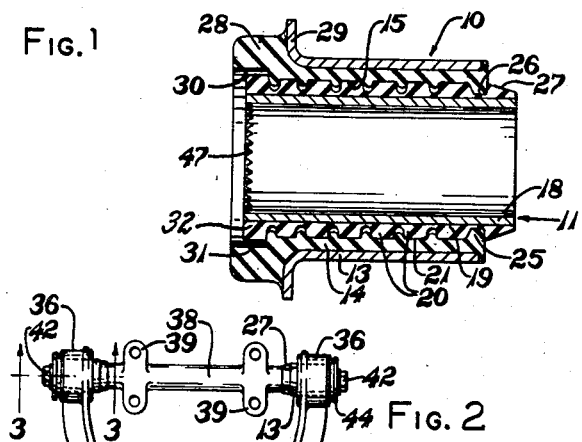
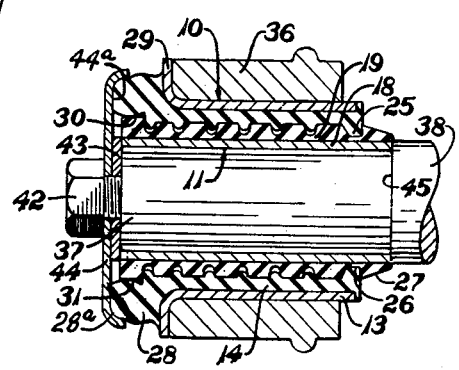

United States Patent Office 3,107,952
Patented Oct. 22, 1963

3,107,952
BUSHING ASSEMBLY
Donald C. Palm, Cuyahoga Falls, Ohio, assignor to The B. F. Goodrich Company, New York, N.Y., a corporation of New York
Continuation of application Ser. No. 654,948, Apr. 24, 1957. This application May 29, 1961, Ser. No. 113,406
3 Claims. (Cl. 308—36.1)

This invention relates to pivotal joints and more particularly to an improved resilient pivotal bushing assembly for use as a resilient connector between pivotal links and the like. This application is a continuation of my co-pending application Serial No. 654,948, filed April 24, 1957, now abandoned.

The bushing assembly of this invention provides for substantially unimpeded pivotal movement of the parts it interconnects throughout a wide oscillating range together with resilient cushioning of shock forces transmitted to the bushing. In view of these characteristics these bushings are especially useful in automotive wheel suspension mechanisms for connecting links of the suspension mechanisms to the vehicle frame. One particular advantage of these bushings for this purpose is that they do not impose a so-called "parasitic drag" on the springing action of the main suspension springs, which is an objectionable feature of the rubber torsion-type bushing assemblies which have been heretofore used for this purpose.

A resilient pivotal bushing assembly according to this invention in general includes a pair of concentric bushing members having opposing bearing surfaces extending axially of the bushing members upon which surfaces the bushing members are rotatable relative to each other. Also there are transverse bearing surfaces at one end of the members adapted for mutual rotary engagement. The axial bearing surface of the least one of the bushing members is defined by the series of resilient rubber ribs spaced apart axially of the assembly and which are rotatably engaged with the bearing surface of the opposing bushing member. At least one of the transverse bearing surfaces is formed on a resilient rubber part. Means is provided adjacent at least one end of the assembly for resiliently interconnecting the bushing members for relative rotary engagement to prevent axial displacement of the members and to seal the bearing surfaces from penetration of foreign matter. A lubricating material may be compounded directly into the rubber ribs, or a suitable lubricant separate from the rubber may be packed between the ribs. In the latter case the interconnecting means also functions to retain the lubricant between the bushing members.

The term "rubber" in this specification means both natural rubber and synthesized materials having the elasticity and resilience characteristic of natural rubber.

A bushing assembly embodying this invention is shown in the accompanying drawings to which reference will be made in the further explanation of the invention.

In the drawings:

FIG. 1 is a longitudinal cross-sectional view of a bushing assembly made in accordance with the invention;

FIG. 2 is a plan view of a lower control arm of a typical automobile wheel suspension link in which bushing assemblies of FIG. 1 are operatively installed; and FIG. 3 is a sectional view taken on the line 3—3 of FIG. 2.

Referring to FIG. 1, the bushing assembly there shown includes an outer bushing member 10 concentrically surrounding an inner bushing member 11. The outer member 10 is formed with a metal cylindrical sleeve 13 having a circumferentially continuous annular body of resilient rubber 14 bonded to the inner surface of the sleeve 13 and formed with a cylindrical internal bearing surface 15.

The inner bushing member 11 includes a rigid tubular metal sleeve 18 having adhered to its external surface an annular circumferentially continuous layer of resilient rubber 19. The rubber layer 19 is shaped to provide a series of annular circumferential ribs 20 spaced apart from each other axially of the assembly. Each of the ribs terminates in a generally cylindrical outer surface 21 and these surfaces collectively define the bearing surface for the inner bushing member 11. The ribs 20 are of uniform height and axial width and are proportioned so that the total area of their outer surfaces 21 is equal to about 60% of the opposing cylindrical surface 15 of the outer bushing member 10 before the parts are assembled. Generally the ribs will be compressed slightly after the assembly is made. After assembly of the inner and outer bushing members the internal bearing surface 15 of member 10 which is initially made cylindrical, is compressed slightly so that it bulges somewhat into the spaces between ribs 20 as shown in FIG. 1. In the operation of this bushing the bearing surfaces 21 of the ribs 20 are adapted to rub against the opposing rubber bearing surface 15 when either of the bushing members is rotated relative to the other about their concentric axis. Radial loads whether sustained or intermittent are cushioned primarily by radial bulging of the resilient rubber ribs 20. Inasmuch as the opposing bearing surfaces are of rubber material, wear is minimized and satisfactory service life for the bushing may be obtained.

Depending on the maximum radial loads imposed on the bushing assembly, the total area of the bearing surface of the ribs (the outer surfaces 21 in FIG. 1) may range from about 30% of the opposing cylindrical bearing surface up to about 75% of the opposing bearing surface. That is to say, the ribs may be made appreciably narrower where comparatively small radial loads are imposed on the assembly.

Lubrication of the bearing surfaces may be obtained by compounding the rubber parts with suitable lubricating ingredients incorporated therein. Preferably, however, the bushing members are assembled with the spaces between the ribs 20 packed with a separate lubricant such as a grease (not indicated in drawing) which does not have deleterious effects on the rubber parts. One lubricant suitable for this purpose is a commercially available silicon grease which is insoluble in water and which is stable over a temperature range of about —40° F. to +400° F. Normally the bushing assemblies are packed with such grease when the bushing members are assembled by their manufacturer and need not be repacked for the life of the bushing. In automotive service, the bushing assemblies should remain lubricated for the normally expected life of the vehicle. However, conventional grease fittings (not shown) could be utilized to repack these bushings periodically.

The bushing members 10 and 11 are rotatably interlocked when assembled as shown in FIG. 1 by means of an annular rubber rib 25 formed on the rubber layer 14 of member 10 and which projects radially into interlocking engagement with a circumferential groove 26 in the rubber layer 19 of inner bushing member 11. The end of the rubber layer 19 is appropriately tapered as at numeral 27 to facilitate this assembly. When the outer and inner bushing members are forced axially together, the rib 25 rides up the tapering end 19 and snaps into its groove 26 and is thereafter rotatable in groove 26 during relative pivotal movement of the bushing members but precludes relative axial displacement of the bushing members. The sealing rib 25 further prevents leakage of the lubricant from the bushing assembly and also keeps water, dirt and other foreign matter from entering between the bearing surfaces. The bushing members are fitted together into an assembly as shown in FIG. 1 with or without lubricant between their respective bearing surfaces as the case may be, and the user in turn incorporates the assembly into a particular linkage desired.

The bushing of FIG. 1 is particularly designed for automotive suspension linkages and, therefore, certain portions of the rubber layers 14 and 19 are arranged to cushion axial forces imposed on the assembly. For this purpose the rubber body 14 further includes an end portion 28 which extends axially beyond the metal sleeve 13 and is adhered to a radially outward extending flange 29 at the end of sleeve 13. The end portion 28 includes an axial bearing face 30 adapted to embrace an opposing axial bearing face 31 formed on an end portion 32 of the rubber layer 19 of the inner member 11 when the bushing is assembled in a suspension linkage. The end portion 32 is seated wholly within the end portion 28 of the outer bushing member 10. As hereinafter explained, the bushing assembly is installed in a manner such that the rubber end portion 28 is axially compressed against flange 29 and squeezed about end portion 32 of the inner layer. Notwithstanding such axial compression, however, the bushing members remain relatively rotatable with substantially unimpeded pivotal movement.

In the bushing assembly of FIGS. 1–3 there is no restriction on the range through which the bushing members may be rotationally oscillated relative to each other. Normally, in these bushings the torque required to initially rotate one bushing member relative to the other (the so-called "break-away" torque) is greater than the torque required to sustain the rotary motion. However, even the break-away torque required for this assembly is very much lower than the initial torque required to deflect rubber torsion bushings of equivalent size heretofore used for this purpose. Moreover, by virtue of the ribbed configuration of one of the bearing surfaces this bushing assembly provides materially softer cushioning for radial bearing loads.

FIGS. 2 and 3 illustrate the manner in which bushing assemblies of the type shown in FIG. 1 may be installed as the pivotal connectors of the lower control arm 35 of a typical automotive wheel suspension linkage. The control arm 35 at its wide end includes two axial aligned annular bosses 36 through which project the opposite ends 37 of a pivot pin 38 adapted to be secured to the frame (not shown) of a vehicle by lugs 39. A bushing assembly as in FIG. 1 is positioned in each boss 36 about the end 37 of pin 38 as shown in detail in FIG. 3. The bushing assembly is installed preferably with its outer metal sleeve 13 pressed into boss 36 and with its inner metal sleeve 18 fastened to end 37 by a cap screw 42, a washer 43 and an annular end plate 44. The inwardly directed end of the inner sleeve 18 is plane and abuts a shoulder 45 of pin 38. To prevent inner sleeve 18 from rotating on 37 of pin 38, the outboard end of sleeve 18 is formed with serrations 47 (FIG. 1) which are engaged by intermeshing radial serrations (not shown) at the periphery of washer 43. Alternatively, the inner bushing member may be secured on end 37 by any of various available fastening devices and the serrated construction may be omitted. The end plate 44 is dish-shaped and slightly compresses the end portion 28 of the outer rubber portion 14 of the outer bushing member 10 as indicated in FIG. 3. In the operation of this assembly, the control arm 35 will be swung pivotally relative to pin 38 to rotate the outer bushing members 10 freely about their respective inner bushing members 11. Axial forces on the bushing are cushioned by the radial overlapping engagement of plate 44 with the rubber end portion 28, the outer radial face 28a of rubber portion 28 serving as a transverse bearing surface for bushing member 10 and the inner face 44a of plate 44 serving as a transverse bearing surface for the inner bushing member 11.

Depending on the service for which these bushings are used, the rigid shell portions thereof can be made of any rigid material such as molded nylon, hard rubber, etc. in lieu of metal. In all cases, however, at least one of the bearing surfaces is formed of narrow resilient rubber ribs spaced apart from each other axially of the bushing. Rubber compounds having a hardness of about 70 Shore A durometer and a durability comparable to tire tread rubber stock is generally satisfactory for the resilient rubber portions of the bushing members.

Variations in the constructions disclosed may be made within the scope of the appended claims.

What is claimed is:

1. A resilient pivotal bushing assembly comprising a pair of concentric bushing members having opposed bearing surfaces extending axially of the bushing, the axial bearing surface of at least one of said members being defined by a plurality of resilient rubber ribs arranged in axially spaced relation to each other with only the extremity portions of said ribs projecting into rotatable engagement with the bearing surface of the opposing member, a grease composition compatible with the rubber of said ribs in the spaces between the ribs for lubricating the bushing members for relative rotary movement, one of said bushing members having a transverse bearing surface extending outward from one end of the axial bearing surface thereon, said transverse bearing surface being formed on an annular body of resilient rubber and being adapted for rotary engagement with a part rigidly connected to the other of said bushing members in an installation of said assembly, said body of rubber being adapted for compression in response to axial loads on the bushing assembly, a resilient annular rib on one bushing member at the end of the assembly opposite the location of said transverse bearing surface, an annular groove on the other bushing member in which the latter said rib is resiliently interfitted whereby the rib and groove cooperate to resiliently interconnect said bushing members for relative rotary engagement but oppose relative axial displacement of said bushing members and also seal said grease composition, and a conical surface adjoining said groove on the bushing member containing said groove for distending the rib on the opposing bushing member during assembly until said rib is in register with said groove.

2. The resilient pivotal bushing assembly defined in claim 1 in which the axial bearing surface of said bushing member engaged with said extremity portions of said ribs is formed on an annular body of resilient rubber.

3. The assembly defined in claim 2 in which each said bushing member is tubular, and wherein the bearing surface engaged by said ribs is a smooth cylindrical surface in its relaxed condition prior to the assembly of said bushing members with each other.

References Cited in the file of this patent

UNITED STATES PATENTS

| 207,313 | Smith | Aug. 20, 1878 |
| 1,510,804 | Sherwood | Oct. 7, 1924 |
| 2,069,781 | Skillman | Feb. 9, 1937 |
| 2,238,197 | Watson | Apr. 15, 1941 |
| 2,297,483 | Kuhne | Sept. 29, 1942 |
| 2,324,984 | Brown | July 20, 1943 |
| 2,468,985 | Krotz | May 3, 1949 |
| 2,696,841 | Heim | Dec. 14, 1954 |
| 2,797,929 | Herbenar | July 2, 1957 |
| 2,815,253 | Spriggs | Dec. 3, 1957 |
| 2,827,303 | Herbenar | Mar. 18, 1958 |